Patented Oct. 9, 1928.

1,686,964

UNITED STATES PATENT OFFICE.

WILLIAM EGGERT, JR., OF BRIGHTWATERS, NEW YORK.

METHOD OF TREATING PLANTS.

No Drawing.   Application filed December 22, 1924. Serial No. 757,441.

For the purpose of obtaining an improved seed from plants, I make use of the blossoms, stems and adjacent leaves, and prepare from them a fluid substance to which I shall hereafter refer as "mother's milk." To this fluid is added such product of a different variety of plant as may be suitable to cause a favorable change in the inclination of the plants treated. The blossoms, leaves and stems are placed in a crock or barrel, weighted down, covered with water and kept in a temperature favorable for fermentation. After five days of the first stage of alcoholic fermentation the contents of the barrel or crock should be macerated and permitted to ferment for a second period of five to ten days through the putrefactive fermentation stage, at the end of which period the mass is pressed and strained, the resultant fluid being a putrefied liquid extract which I have referred to as mother's milk. To this fluid is added such vegetable material as may be adapted to induce the plant to which it is to be applied as tonic to take it into its system by absorption through the roots. A suitable vegetable material of another variety of plant may be added to the materials used in fermentation, but where such added material is not freely soluble in water it is necessary to boil the additional material in a mixture of water and ashes obtained from the variety of plant intended to be fed for the purpose of producing improved seeds with firmer inclinations of desired description. The proportion of ashes and vegetable product to be added should be about one pound of ashes and about one pound of the selected vegetable product to one gallon of water; all to be boiled together for about one-half hour; then strained through a very loose cloth or coarse sieve, so that the ashes may remain in the fluid. The resultant or derivative of this boiling step is to be added to the mother's milk after the latter is entirely through the fermenting process, at the rate of one gallon of ashes solution to four gallons of the mother's milk.

There should also be added to the mother's milk preparation about one pound of molasses, honey or sugar (maple in some cases) to each gallon of the mother's milk preparation, which is to be used at a rate of about one quart to each plant treated for improved seeds, and is to be applied to the plant at its roots in a basin-like formation of the soil around the stalk of the seed plant (basin about 3 inches deep and about 10 inches in diameter). The application of the mother's milk should be made about one week before the first blossom of the plant becomes openly developed. In forming the basin at the plant's roots the roots may be somewhat exposed but must not be materially injured. The absorption may be facilitated by thrusting a slender stick down through the deposited fluid into the soil below for about six inches in several directions. When the mother's milk preparation has been absorbed by soil about the plant, the soil used as a wall to form the basin is brushed into the basin, leaving the surface about the plant, the same as it was before. Should the plant thus treated be slow in going through the blossoming and seed formation periods, or should there be an unusually heavy rainfall, it may be of benefit to repeat the application about two or three weeks after the first treatment; but ordinarily one application has sufficient influence for one month's further progress of the plant; and seeds are so far advanced that no further treatment is necessary until the next growth from these seeds is to be treated in the same manner.

From seeds of the second year's treatment of the seed-producing plants a small experimental crop may be grown to determine how much the product has been improved and to decide how extensively to treat for the third growth of seeds to be used for growing of crops. If experimental crops of the second year's seed show marked improvement, it would be advisable to grow more seed in the third year's treatment than would be required for one season's planting, making it unnecessary to further treat seed-plants for a year or series of years; but if results are good, it would be advisable to continue the treatment of seed-plants.

By this method of treating plants I have secured finer qualities, greater uniformity, greater resistance to disease and attacks by insects, increased ester and acid contents or ester-forming material, greater strength, and a far greater control over inclinations to vary than were obtained through years of hybridizing and cross-breeding.

The mother's milk is substantially a liquid extract and concentration intended to furnish to each seed-plant about ten times as much of its juices, etc., as the plant contains, and includes many times as much honey or saccharine as would trickle to its roots when the blossoms are filled with rain to overflowing.

Suitable or workable proportions are: to five gallons of the mother's milk add five pounds of sugar (maple preferred) or honey or molasses; also, one to two pounds of ashes of the variety of plant to be treated are boiled for one-half hour in one gallon of water, adding such substances of vegetable origin as may be adapted to induce the plant to include new flavors in completing its productions. The special additions are: for tobacco, gum benzoin, to secure finer aroma and to reduce the sting and bitterness of tobacco; for cotton, fresh sassafras leaves induce insect-repelling properties, and the mucilaginous nature of the leaves promotes finer fibre production; for cauliflower, fresh asparagus stalks are added to introduce finer flavor, more regular heading, or flowering, and to promote seed productions.

In the specific treatment of tobacco plants, I prepare a putrefied liquid extract from blossoms and tops of tobacco plants of the same variety. I then mix with water, some pulverized gum benzoin and ashes of the tobacco plant. The proportions may be one-quarter pound gum benzoin, two pounds of ashes, in one gallon of water, these having been found practical. Boil this mixture for a suitable length of time, say one-half an hour, to cause the gum benzoin to unite with the ashes to form benzoate of soda or benzoate of potash. This resultant is then mixed with the previously mentioned putrefied liquid extract, at the same time adding saccharine matter. The tobacco plants treated with this tonic during their blossoming periods for three successive generations have developed new and firm tendencies for a milder and more fragrant product and other characteristics as above pointed out.

The volume of material of the mother's milk thus obtained would be six gallons; a quantity sufficient to apply to the roots of twenty-four plants intended for seed productions.

The phrase "products of tobacco plants" as used herein, means leaves and seeds of the plants.

Having fully described the method and means for securing new and valuable improvements in quality of the plants' products, it is requested that protection of Letters Patent be granted on claims as follows:—

1. The method of treating seed-producing plants to improve their quality and tendencies consisting of supplying to the roots of the plant at its blossoming time a fermented solution of leaves and petals of the same variety of plant, said solution containing a sweetening ingredient, and a derivative of gum benzoin.

2. The method of treating seed-producing plants consisting in supplying to the roots of the plant at its blossoming time a putrefied liquid extract of the same variety of plant as that being treated, with gum benzoin in solution and repeating the treatment in successive years to plants grown from the improved seeds produced in the previous years.

3. The method of treating seed-producing plants consisting in supplying to the roots of the plant at its blossoming time a mixture of a putrefied liquid extract of the kind of plant being treated and ashes of the same kind of plant, said mixture including a derivative of gum benzoin, and repeating the treatment in successive years to plants grown from the improved seeds produced in the previous year.

4. Steps in the method of treating seed-producing tobacco plants, consisting in preparing a fermented solution of leaves and petals of the same variety of tobacco with maple sugar in solution, and adding thereto benzoate of soda or potash.

5. The method of treating seed-producing plants to improve the quality and tendencies of their products, which consists in supplying to the roots of the plants at their blossoming time a fermented solution of leaves and petals of the same variety of plant, said solution containing a sweetening ingredient and a flavoring material partly of vegetable origin.

6. The method of treating seed-producing plants to improve the quality and tendencies of their products, which consists in supplying to the roots of the plants at their blossoming time a putrefied liquid extract of the same variety of plant as that being treated, said extract including a flavoring material partly of vegetable origin, and repeating the treatment in successive years to plants grown from the improved seeds produced in the previous years.

7. The method of treating seed-producing plants to improve the quality and tendencies of their products, which consists in supplying to the roots of the plants at their blossoming time a mixture of a putrefied liquid extract of the kind of plant being treated and ashes of a vegetable origin, and a flavoring material of vegetable origin and repeating the treatment in successive years to plants grown from the improved seeds produced in the previous year.

8. Steps in the method of treating seed-producing tobacco plants, consisting in preparing a fermented solution of leaves and petals of the same variety of tobacco with a sweetening ingredient in solution, and adding thereto a derivative of gum benzoin.

9. Improved products of tobacco plants which have been treated with a derivative of gum benzoin, the products, namely, leaves and seeds being characterized by a constitutional change as compared with products of the original untreated tobacco plants, said improved products being more aromatic, sturdier, more capable of resisting disease, and less bitter than those of the original plants.

10. Improved products of tobacco plants which have been treated with a putrefied liquid extract of the same variety of plant, carrying a derivative of gum benzoin, the products, namely, leaves and seeds being characterized by a constitutional change as compared with products of the original untreated tobacco plants, said change resulting in products which are more aromatic, sturdier, more capable of resisting disease, and less bitter than those of the original plants.

Signed at New York city, in the county of New York and State of New York, this 20th day of December, A. D. 1924.

WILLIAM EGGERT, Junior.